(12) United States Patent
Suddaby

(10) Patent No.: US 12,196,172 B2
(45) Date of Patent: Jan. 14, 2025

(54) WAVE ENERGY CAPTURE AND CONVERSION DEVICE

(71) Applicant: Loubert S. Suddaby, Orchard Park, NY (US)

(72) Inventor: Loubert S. Suddaby, Orchard Park, NY (US)

( * ) Notice: Subject to any disclaimer, the term of this patent is extended or adjusted under 35 U.S.C. 154(b) by 74 days.

(21) Appl. No.: 18/162,855

(22) Filed: Feb. 1, 2023

(65) Prior Publication Data

US 2024/0141862 A1 May 2, 2024

Related U.S. Application Data

(63) Continuation-in-part of application No. 18/162,815, filed on Feb. 1, 2023, which is a continuation-in-part of application No. 18/058,782, filed on Nov. 25, 2022, now Pat. No. 11,959,452, which is a continuation-in-part of application No. 18/051,115, filed on Oct. 31, 2022, now Pat. No. 11,867,144.

(51) Int. Cl.
*F03B 13/18* (2006.01)
*F03B 13/14* (2006.01)

(52) U.S. Cl.
CPC .............. *F03B 13/18* (2013.01); *F03B 13/14* (2013.01)

(58) Field of Classification Search
CPC .......... F03B 13/18; F03B 13/14; Y02E 10/30
See application file for complete search history.

(56) References Cited

U.S. PATENT DOCUMENTS

| | | | | |
|---|---|---|---|---|
| 123,448 A | | 2/1889 | Brooks | |
| 415,812 A | * | 11/1889 | Dowe | F03B 13/1865 60/504 |
| 418,612 A | * | 12/1889 | Goldman | F01B 17/02 60/504 |
| 552,872 A | * | 1/1896 | Schade | F03B 17/00 60/503 |
| 559,107 A | * | 4/1896 | Rose | F03B 13/1815 60/505 |
| 583,689 A | * | 6/1897 | McDonald | F03B 13/186 60/507 |
| 643,557 A | * | 2/1900 | Swearingen | F03B 13/1815 60/505 |

(Continued)

FOREIGN PATENT DOCUMENTS

| | | |
|---|---|---|
| DE | 102017008478 | 3/2019 |
| EP | 1930597 | 6/2008 |

(Continued)

OTHER PUBLICATIONS

Christos Charisiadis, An introductory presentation to the "Archimedean Screw" as a low Head Hydropower Generator, WATENV, 2015.

(Continued)

*Primary Examiner* — Pedro J Cuevas
(74) *Attorney, Agent, or Firm* — Harter Secrest & Emery LLP; Michael Nicholas Vranjes

(57) ABSTRACT

A wave energy conversion assembly, including a first motion conversion assembly including a first wheel, an arm connected to the motion conversion assembly, and a float connected to the arm, wherein the float is operatively arranged to engage fluid to displace the wheel in a first circumferential direction.

20 Claims, 8 Drawing Sheets

(56) References Cited

U.S. PATENT DOCUMENTS

| | | | | |
|---|---|---|---|---|
| 657,943 A * | 9/1900 | Kimball | F03B 13/1815 | 60/505 |
| 659,609 A * | 10/1900 | McIntyre | F03B 13/1815 | 60/506 |
| 674,002 A * | 5/1901 | Gehre | B60K 6/48 | 185/35 |
| 714,166 A * | 11/1902 | Essington | F03B 13/1815 | 74/133 |
| 739,538 A * | 9/1903 | Fredson | F03B 13/186 | 74/132 |
| 814,362 A * | 3/1906 | Dill | F16D 59/00 | 188/187 |
| 969,665 A * | 9/1910 | Shinn | F03B 13/1815 | 60/507 |
| 991,265 A * | 5/1911 | Barteau | F03B 13/1815 | 60/506 |
| 1,051,974 A * | 2/1913 | Stribling | F03B 13/1815 | 60/505 |
| 1,170,938 A * | 2/1916 | Schaser | F03B 13/186 | 60/507 |
| 1,270,221 A * | 6/1918 | Shade | F03B 13/1815 | 60/505 |
| 1,369,593 A * | 2/1921 | Wilkin | F03B 13/182 | 60/507 |
| 1,371,836 A | 3/1921 | Antz | | |
| 1,542,464 A * | 6/1925 | McNeil | F03B 13/1815 | 74/163 |
| 1,667,152 A * | 4/1928 | Hegge | F03B 13/1815 | 60/505 |
| 1,701,146 A * | 2/1929 | Darwin | F03B 13/262 | 60/507 |
| 1,823,190 A * | 9/1931 | Neil | F03B 13/1815 | 74/134 |
| 1,928,986 A * | 10/1933 | Snell | F03B 13/1855 | 60/505 |
| 1,968,235 A * | 7/1934 | Webber | F03B 13/1815 | 60/506 |
| 2,014,989 A * | 9/1935 | Sieff | A63B 51/16 | 473/556 |
| 2,094,535 A * | 9/1937 | Harrison | A01D 46/00 | 56/8 |
| 2,494,165 A | 1/1950 | Pierre | | |
| 2,640,326 A * | 6/1953 | Hunter | F03B 13/181 | 405/76 |
| 3,259,361 A * | 7/1966 | Cantu | F03B 13/1815 | 60/505 |
| 3,894,241 A * | 7/1975 | Kaplan | F03B 13/1865 | 290/53 |
| 4,034,565 A * | 7/1977 | McVeigh | F03B 17/025 | 60/507 |
| 4,103,494 A * | 8/1978 | Tidwell | F03B 13/1855 | 60/507 |
| 4,249,639 A * | 2/1981 | Vukovic | F03B 13/1815 | 60/507 |
| 4,389,843 A * | 6/1983 | Lamberti | F03B 13/1815 | 60/507 |
| 4,418,286 A * | 11/1983 | Scott | F03B 13/1845 | 60/507 |
| 4,462,762 A * | 7/1984 | Palani | F03B 13/1815 | 60/506 |
| 4,541,242 A * | 9/1985 | Thompson, Jr. | F03B 13/1815 | 60/507 |
| 4,598,547 A * | 7/1986 | Danihel | F03B 13/1815 | 60/507 |
| 4,610,140 A * | 9/1986 | Thompson, Jr. | F03B 13/1815 | 474/148 |
| 4,612,768 A * | 9/1986 | Thompson, Jr. | F03B 13/1815 | 60/527 |
| 5,366,341 A * | 11/1994 | Marino | F03B 13/1815 | 60/507 |
| 5,929,531 A * | 7/1999 | Lagno | F03B 13/262 | 417/330 |
| 6,083,382 A | 7/2000 | Bird | | |
| 6,220,425 B1 | 4/2001 | Knapp | | |
| 7,152,556 B2 | 12/2006 | Goltsman | | |
| 7,444,810 B2 * | 11/2008 | Olson | F03B 13/1815 | 60/497 |
| 7,735,319 B2 * | 6/2010 | Vukovic | F03B 13/1815 | 60/507 |
| 8,093,735 B1 * | 1/2012 | Rosiglioni | F03B 13/189 | 290/53 |
| 8,536,724 B2 * | 9/2013 | Dullaway | F03B 13/20 | 290/53 |
| 8,648,485 B1 * | 2/2014 | Grossi | F03G 1/00 | 290/53 |
| 8,723,350 B2 * | 5/2014 | Vamvas | F03B 13/18 | 290/53 |
| 8,779,613 B2 * | 7/2014 | Azpiroz Villar | F03B 13/20 | 290/53 |
| 9,212,649 B2 * | 12/2015 | Heim | F03B 13/1815 | |
| 9,243,606 B2 * | 1/2016 | Dicembrino | F03B 13/1855 | |
| 9,279,407 B2 | 3/2016 | Sinclaire | | |
| 9,309,860 B2 | 4/2016 | Hon | | |
| 9,322,278 B2 | 4/2016 | Hindle et al. | | |
| 9,759,180 B2 | 9/2017 | Russo | | |
| 10,028,444 B2 | 7/2018 | McCully et al. | | |
| 11,421,645 B1 | 8/2022 | Suddaby | | |
| 11,459,997 B2 | 10/2022 | Parsa et al. | | |
| 2002/0078687 A1 | 6/2002 | Donnelly | | |
| 2008/0164699 A1 * | 7/2008 | Vieira | F03B 13/1815 | 290/54 |
| 2008/0169653 A1 * | 7/2008 | Olson | F03B 13/1815 | 60/398 |
| 2008/0295510 A1 * | 12/2008 | Vukovic | F03B 13/1815 | 60/505 |
| 2010/0266406 A1 | 10/2010 | Eielsen | | |
| 2011/0068579 A1 * | 3/2011 | Dullaway | F03B 13/20 | 290/53 |
| 2012/0104761 A1 * | 5/2012 | Vamvas | F03B 13/10 | 290/53 |
| 2012/0167563 A1 | 7/2012 | Cherepashenets et al. | | |
| 2013/0038064 A1 * | 2/2013 | Azpiroz Villar | F03B 13/20 | 290/53 |
| 2013/0134715 A1 | 5/2013 | Sinclaire | | |
| 2013/0302174 A1 | 11/2013 | Hindle et al. | | |
| 2014/0110494 A1 | 4/2014 | Mills et al. | | |
| 2014/0265337 A1 | 9/2014 | Harding et al. | | |
| 2015/0069761 A1 * | 3/2015 | Heim | F03B 13/1815 | 290/53 |
| 2016/0141911 A1 * | 5/2016 | Al-Garni | H02J 7/35 | 307/48 |
| 2016/0368006 A9 | 12/2016 | Mills et al. | | |
| 2017/0009733 A1 * | 1/2017 | Ruiz Diez | F03B 13/20 | |
| 2021/0301777 A1 | 9/2021 | Parsa et al. | | |

FOREIGN PATENT DOCUMENTS

| | | |
|---|---|---|
| EP | 3892848 | 10/2021 |
| FR | 2457989 | 12/1980 |
| GB | 2361749 | 10/2001 |
| KR | 102271940 | 7/2021 |
| WO | 2010082129 | 7/2010 |
| WO | 2015150194 | 10/2015 |
| WO | 2023025678 | 3/2023 |

OTHER PUBLICATIONS

Archimedes Screw Generators, GreenBug Energy Inc., 2020.

* cited by examiner

WAVE ENERGY CAPTURE AND CONVERSION DEVICE

CROSS-REFERENCE TO RELATED APPLICATIONS

This application is filed under 35 U.S.C. § 120 as a continuation-in-part of U.S. patent application Ser. No. 18/162,815, filed on Feb. 1, 2023, which application is a continuation-in-part of U.S. patent application Publication Ser. No. 18/058,782, filed on Nov. 25, 2022, which application is a continuation-in-part of U.S. patent application Ser. No. 18/051,115, filed on Oct. 31, 2022, which applications are hereby incorporated by reference in their entireties.

FIELD

The present disclosure relates to wave energy capture devices, and more particularly, to motion conversion devices for converting oscillating wave motion to rotational motion, to generate electricity.

BACKGROUND

The ocean is undoubtedly the largest solar panel on the planet covering 70% of the earth's surface. Additionally, wave energy contains one of the densest forms of natural energy available on earth. The theoretical annual energy production of waves off the costal United States is estimated to be as much as 2.64 trillion kilowatt hours.

While various eyesores have been proposed and currently operate to capture green noncarbon based energy, they still destroy wildlife in droves and occupy large swaths of arable land while purporting to be ecologically friendly. The destruction of large surface areas to extract minerals to construct solar electric batteries and the vast amounts of hydrocarbons burned to manufacture solar panels, and wind turbines that will populate innumerable land masses for generations speaks to the flawed logic of current green energy endeavors.

It would seem, therefore, prudent to utilize the vast amounts of energy stored in ocean waves to economically, efficiently, and efficaciously convert natural energy contained in the ocean into electricity in an easy, reliable, and environmentally friendly manner.

Thus, there is a pressing need for ecofriendly energy capture mechanisms that can simultaneously provide the dream of abundant clean energy all while preventing the various blights that current mechanisms employ.

SUMMARY

According to aspects illustrated herein, there is provided a wave energy conversion assembly, comprising a first motion conversion assembly including a first wheel, an arm connected to the motion conversion assembly, and a float connected to the arm, wherein the float is operatively arranged to engage fluid to displace the wheel in a first circumferential direction.

In an exemplary embodiment, the first motion conversion assembly comprises a reciprocating element including at least one pawl, and a line connected to the reciprocating element and the first wheel. In an exemplary embodiment, when the reciprocating element is displaced in a first direction, the at least one pawl engages the line, and when the reciprocating element is displaced in a second direction, opposite the first direction, the at least one pawl disengages the line. In an exemplary embodiment, the line comprises a first side and a second side, the first wheel is engaged with the first side, and the at least one pawl is engaged with the second side. In an exemplary embodiment, the first motion conversion assembly further comprises a second wheel spaced apart from the first wheel to create tension in the line.

In an exemplary embodiment, the wave energy conversion assembly further comprises a housing, wherein the first motion conversion assembly is arranged in the housing. In an exemplary embodiment, the housing forms a fulcrum engaged with the arm. In an exemplary embodiment, the housing is buoyant. In an exemplary embodiment, the wave energy conversion assembly further comprises a second motion conversion assembly including a second wheel. In an exemplary embodiment, the second motion conversion assembly comprises a reciprocating element including at least one pawl, a shaft connected to the reciprocating element, and a line connected to the reciprocating element and the second wheel, wherein the housing and second wheel are operatively arranged to displace with respect to the reciprocating element. In an exemplary embodiment, when the housing and second wheel are displaced in a first direction, the at least one pawl engages the line, and when the housing and second wheel are displaced in a second direction, the at least one pawl disengages the line. In an exemplary embodiment, the second motion conversion assembly further comprises a tensioning member operatively arranged to bias the housing to a starting elevational position. In an exemplary embodiment, the shaft is flexible.

In an exemplary embodiment, the first wheel is connected to a generator. In an exemplary embodiment, the arm is connected to the first wheel via a freewheel connection. In an exemplary embodiment, the freewheel connection comprises a plurality of teeth arranged on one of the arm and the first wheel, and one or more pawls arranged on the other of the arm and the first wheel. In an exemplary embodiment, the one or more pawls are operatively arranged to engage the plurality of teeth when the arm is displaced in the first circumferential direction, and disengage the plurality of teeth when the arm is displaced in a second circumferential direction, opposite the first circumferential direction. In an exemplary embodiment, the wave energy conversion assembly further comprises a second arm connected to the first wheel, and a second float connected to the second arm.

According to aspects illustrated herein, there is provided a wave energy conversion assembly, comprising a housing, a motion conversion assembly arranged in the housing and including a line, a reciprocating element comprising at least one pawl arranged to removably engage the line, and at least one wheel engaged with the line, an arm including a first portion arranged in the housing and connected to the reciprocating element and a second portion arranged outside the housing, and a float connected to the second portion, wherein relative movement between the float and the housing causes the reciprocating element to displace the line and the at least one wheel in a single circumferential direction.

According to aspects illustrated herein, there is provided a wave energy conversion assembly, comprising a housing, a wheel arranged in the housing, and one or more arms connected to the wheel via a freewheel connection, wherein each arm of the one or more arms includes a first portion arranged in the housing and connected to the wheel, a second portion arranged outside the housing, and a float connected to the second portion, wherein relative movement between the float and the housing causes the wheel to displace in a single circumferential direction.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1:
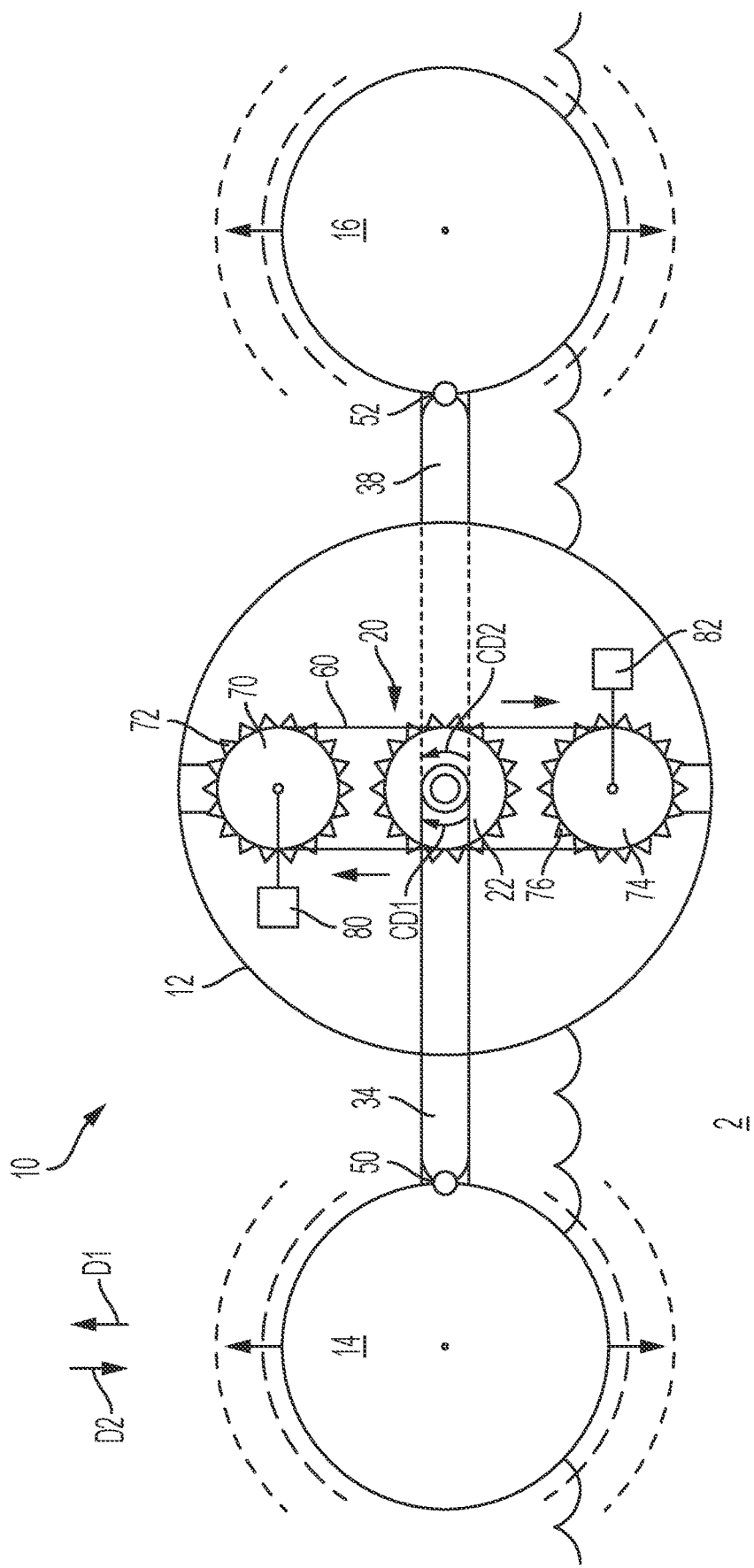
FIG. 1 is a front elevational view of a wave energy conversion assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

By "non-rotatably connected" elements, it is meant that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that: the elements are rotatable with respect to each other.

Adverting now to the figures, FIG. 1 is a front elevational view of wave energy conversion assembly 10. Wave energy conversion assembly 10 generally comprises freewheel or motion conversion assembly 20 and at least one float, for example float 14 and float 16. Freewheel assembly 20 is operatively arranged to displace one or more shafts in a single circumferential direction, so as to generate electricity. For example, freewheel assembly 20 may circumferentially displace one or more shafts or gears to deliver rotational motion to generator 80, 82 such that generator 80, 82 produces electricity.

In an exemplary embodiment, freewheel assembly 20 may be connected to one or more gears, for example sprocket or gear or wheel 70 and/or sprocket or gear or wheel 74, via chain or belt or line 60. It should be appreciated that a line as used herein may include a chain, belt, string, wire, strap, cable, or the like. In an exemplary embodiment, line 60 is arranged such that freewheel assembly 20, specifically sprocket or gear or wheel 22, wheel 70, and/or wheel 74 are non-rotatably connected. Thus, as wheel 22 is displaced in circumferential direction CD1, wheel 70 and wheel 74 are displaced in circumferential direction CD1.

Wheel 70 comprises teeth 72 which engage line 60 (e.g., via chain links, slots, notches, or grooves in a belt, holes in a belt, etc.). Wheel 70 is non-rotatably connected to generator 80, for example, via a shaft and/or gears. Wheel 74 comprises teeth 76 which engage line 60 (e.g., chain links, slots or grooves in a belt, holes in a belt, etc.). Wheel 74 is non-rotatably connected to generator 82, for example, via a shaft and/or gears. In an exemplary embodiment, at least one of freewheel assembly 20, wheel 70, wheel 74, line 60, generator 80, and generator 82 are arranged in housing 12. In an exemplary embodiment, freewheel assembly 20, wheel 70, wheel 74, line 60, generator 80, and generator 82 are completely enclosed in housing 12. In an exemplary embodiment, housing 12 is buoyant and floats on or in water or fluid 2. In such embodiments, wave energy conversion assembly 10 can be placed in water 2 in an off-shore configuration (i.e., not visible from shore), which is desirable from an aesthetics standpoint.

Float 14 is a buoyant structure that is connected to freewheel assembly 20. In an exemplary embodiment, float 14 is connected to freewheel assembly 20 via arm or shaft 34. In an exemplary embodiment, float 14 is pivotably connected to arm 34 via connector 50. Connector 50 may be, for example, a hinge, a ball and socket joint, a universal joint, or the like. Float 14 (and arm 34) is operatively arranged to be non-rotatably connected to freewheel assembly 20 when displaced in first circumferential direction CD1 but rotatably connected to freewheel assembly 20 when displaced in second circumferential direction CD2, as will be described in greater detail below.

Float 16 is a buoyant structure that is connected to freewheel assembly 20. In an exemplary embodiment, float 16 is connected to freewheel assembly 20 via arm or shaft 38. In an exemplary embodiment, float 16 is pivotably connected to arm 38 via connector 52. Connector 52 may be, for example, a hinge, a ball and socket joint, a universal joint, or the like. Float 16 (and arm 38) is operatively arranged to be non-rotatably connected to freewheel assembly 20 when displaced in first circumferential direction CD1 but rotatably connected to freewheel assembly 20 when displaced in second circumferential direction CD2, as will be described in greater detail below.

The buoyancy of housing 12, float 14, and float 16 provides relative movement between components that activates freewheel assembly 20. For example, floats 14 and 16 are capable of relative movement with respect to housing 12 due to movement of water 2. Likewise, housing 12 is capable of relative movement with respect to floats 14 and 16 due to movement of water 2.

Figure 2:
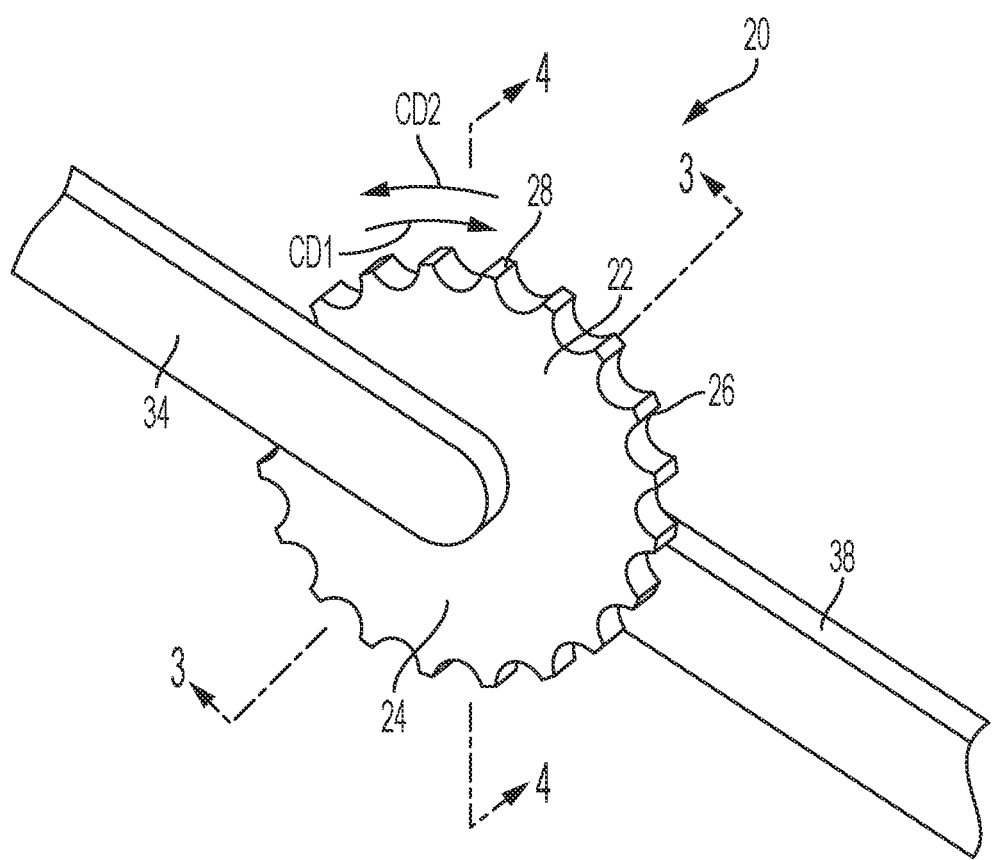
FIG. 2 is a perspective view of the freewheel assembly shown in FIG. 1.

FIG. 2 is a perspective view of freewheel assembly 20. Freewheel assembly 20 generally comprises wheel 22 and one or more connection means to arm or shaft 34 and/or arm or shaft 38, as will be described in greater detail below. Wheel 22 comprises surface 24 and surface 26, opposite surface 24. In an exemplary embodiment, wheel 22 comprises teeth 28 arranged on a radially outward facing surface thereof, wherein teeth 28 engage line 60. It should be appreciated, however, that in an exemplary embodiment, line 60 may comprise a belt and wheel 22 may engage belt 60 via friction. Arm 34 is connected to and/or engaged with surface 24 and arm 38 is connected to and/or engaged with surface 26.

Freewheel assembly 20 is operatively arranged to displace line 60 in a single circumferential direction. Specifically, as arm 34 is displaced in circumferential direction CD1, for example if float 14 is forced upward in direction D1 by water 2, it engages wheel 22 and wheel 22 also displaces in circumferential direction CD1. As arm 34 is displaced in circumferential direction CD2, for example if water 2 subsides and gravity forces float 14 in direction D2, it disengages wheel 22 and wheel 22 is not displaced in circumferential direction CD2. As arm 38 is displaced in circumferential direction CD2, for example if float 16 is forced upward in direction D1 by water 2, it disengages wheel 22 and wheel 22 is not displaced in circumferential direction CD2. As arm 38 is displaced in circumferential direction CD1, for example if water 2 subsides and gravity forces float 16 in direction D2, it engages wheel 22 and wheel 22 also displaces in circumferential direction CD1. Thus, floats 14 and 16 act in conjunction to displace wheel 22 in circumferential direction CD1 but not circumferential direction CD2. It should be appreciated that freewheel assembly 20 may continue to displace in circumferential direction CD1 even when arms 34 and 38 are not engaged therewith, which is an attribute of a freewheel connection. To aid in this continuous circumferential displacement, wave energy conversion assembly 10 may further comprise a flywheel non-rotatably connected to wheel 22, wheel 70, and/or wheel 74. The flywheel smooths out the energy transfer because the arms are much like a piston crank shaft in an internal combustion engine. The flywheel will free wheel with at least one of wheels 22, 70, and 74, and/or an input shaft of generator 80, 82 to both store and smooth out the intermittent input of energy.

Figure 3:
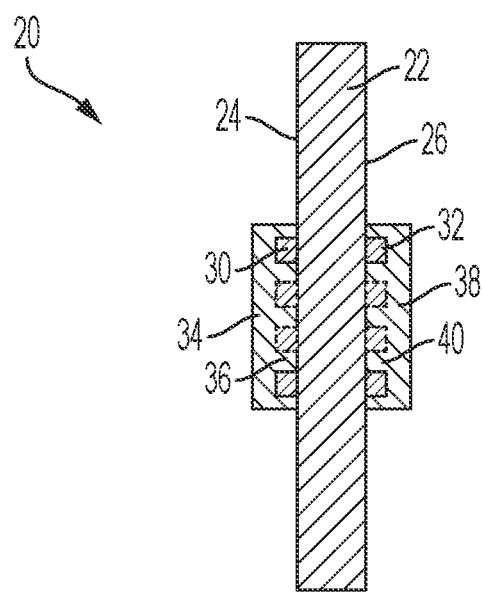
FIG. 3 is a cross-sectional view of a first embodiment of the freewheel assembly taken generally along line 3-3 in FIG. 2.

FIG. 3 is a cross-sectional view of a first embodiment of freewheel assembly 20 taken generally along line 3-3 in FIG. 2. As shown, surface 24 comprises a plurality of teeth 30 that engage a plurality of teeth 36 on arm 34. Teeth 30 may be circumferentially arranged on or in surface 24 and teeth 36 may be circumferentially arranged on or in arm 34 (i.e., similar to a locking differential). Teeth 36 are operatively arranged to engage teeth 30 when arm 34 is displaced in circumferential direction CD1, thereby non-rotatably connecting arm 34 and wheel 22, but disengage teeth 30 when arm 34 is displaced in circumferential direction CD2.

Surface 26 comprises a plurality of teeth 32 that engage a plurality of teeth 40 on arm 38. Teeth 32 may be circumferentially arranged on or in surface 26 and teeth 40 may be circumferentially arranged on or in arm 38 (i.e., similar to a locking differential). Teeth 40 are operatively arranged to engage teeth 32 when arm 38 is displaced in circumferential direction CD1, thereby non-rotatably connecting arm 38 and wheel 22, but disengage teeth 32 when arm 38 is displaced in circumferential direction CD2.

Figure 4:
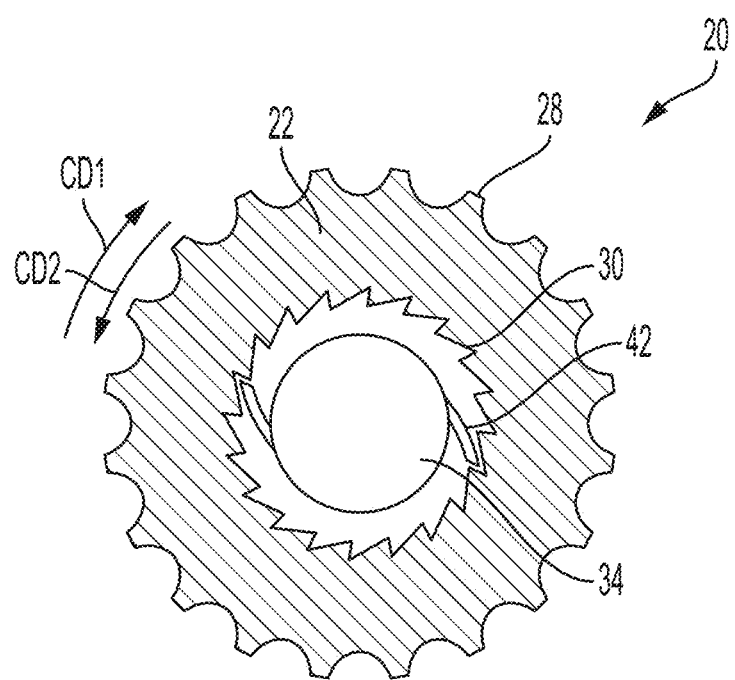
FIG. 4 is a cross-sectional view of a second embodiment of the freewheel assembly taken generally along line 4-4 in FIG. 2.

FIG. 4 is a cross-sectional view of a second embodiment of freewheel assembly 20 taken generally along line 4-4 in FIG. 2. As shown, wheel 22 comprises a plurality of teeth 30 that engage one or more pawls 42 connected to arm 34. Teeth 30 are arranged on a radially inward facing surface of wheel 22. For example, a hole may be formed in surface 24 and teeth 30 are arranged on the radially inward facing surface of the hole. In an exemplary embodiment, teeth 30 may be arranged such that they protrude or extend from surface 24. Pawls 42 are operatively arranged to engage teeth 30 when arm 34 is displaced in circumferential direction CD1, and disengage teeth 30 when arm 34 is displaced in circumferential direction CD2. In an exemplary embodiment, pawls 42 are pivotably connected to arm 34 to aid in such disengagement. In an exemplary embodiment, arm 34 may be connected to a biasing element that biases pawls 42 in a radially outward direction and into engagement with teeth 30. Arm 38 may be similarly connected to wheel 22, wherein arm 38 comprises pawls (not shown) that engage teeth 30 when arm 38 is displaced in circumferential direction CD1, and disengage teeth 30 when arm 38 is displaced in circumferential direction CD2.

Another example of a freewheel device or connection that may be used as freewheel assembly 20 comprises two saw-toothed, spring-loaded discs pressing against each other with the toothed sides together, somewhat like a ratchet. Rotating in one direction, the saw teeth of the drive disc lock with the teeth of the driven disc, making it rotate at the same speed. If the drive disc slows down or stops rotating, the teeth of the driven disc slip over the drive disc teeth and continue rotating, producing a characteristic clicking sound proportionate to the speed difference of the driven gear relative to that of the (slower) driving gear.

Another example of a freewheel device or connection that may be used as freewheel assembly 20 comprises spring-loaded steel rollers or detents inside a driven cylinder. Rotating in one direction, the rollers lock with the cylinder making it rotate in unison. Rotating slower, or in the other direction, the steel rollers just slip inside the cylinder.

In an exemplary embodiment, wave energy conversion assembly 10 may be tethered to a weight on the ocean floor with the tether line also serving to transmit generated electricity to shore. The rachet sprocket chain driven power take off of wave energy conversion assembly 10 mechanically takes oscillatory motion and converts it to rotatory motion to drive a generator.

Figure 5:
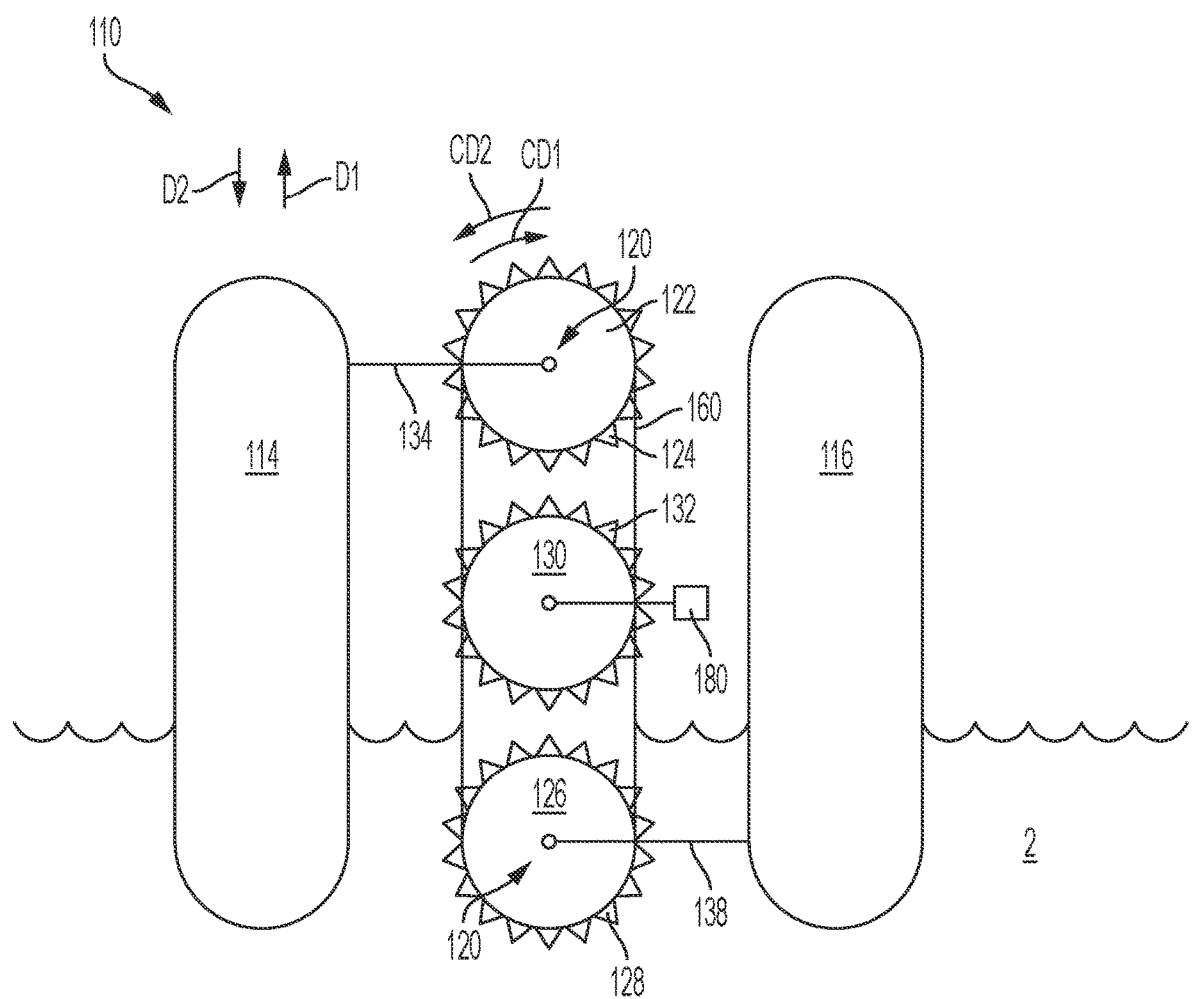
FIG. 5 is a front elevational view of a wave energy conversion assembly.

FIG. 5 is a front elevational view of wave energy conversion assembly 110. Wave energy conversion assembly 110 generally comprises at least one freewheel assembly 120 and at least one float. In the exemplary embodiment shown, wave energy conversion assembly 110 comprises float 114 and float 116 connected to freewheel or motion conversion assembly 120. Freewheel assembly 120 is operatively arranged to displace one or more shafts in a single circumferential direction, so as to generate electricity. For example, freewheel assembly 120 may circumferentially displace one or more shafts or gears to deliver rotational motion to generator 180 such that generator 180 produces electricity.

Float 114 is connected to sprocket or wheel or gear 122 via freewheel assembly 120, which may comprise any freewheel assembly described herein, for example, the freewheel assemblies shown in FIGS. 1-4. Wheel 122 comprises teeth 124 operatively arranged to engage chain or belt or line 160. Similarly, float 116 is connected to sprocket or wheel or gear 126 via freewheel assembly 120, which may comprise any freewheel assembly described herein, for example, the freewheel assemblies shown in FIGS. 1-4. Wheel 126 comprises teeth 128 operatively arranged to engage line 160.

In an exemplary embodiment, wave energy conversion assembly 110 further comprises sprocket or wheel or gear 130. Wheel 130 comprises teeth 132 operatively arranged to engage line 160. In an exemplary embodiment, line 160 is arranged such that wheel 122, wheel 126, and wheel 130 are non-rotatably connected. Thus, as wheel 122 and/or wheel 126 are displaced in circumferential direction CD1, wheel 130 is displaced in circumferential direction CD1. Wheel 130 is non-rotatably connected to generator 180, for example, via a shaft and/or gears.

Float 114 is a buoyant structure that is connected to freewheel assembly 120, specifically wheel 122. In an exemplary embodiment, float 114 is connected to freewheel assembly 120 via arm or shaft 134. In an exemplary embodiment, float 114 is pivotably connected to arm 134. Float 114 (and arm 134) is operatively arranged to be non-rotatably connected to freewheel assembly 120 when displaced in first circumferential direction CD1 but rotatably connected to freewheel assembly 120 when displaced in second circumferential direction CD2.

Float 116 is a buoyant structure that is connected to freewheel assembly 120, specifically wheel 126. In an exemplary embodiment, float 116 is connected to freewheel assembly 120 via arm or shaft 138. In an exemplary embodiment, float 116 is pivotably connected to arm 138. Float 116 (and arm 138) is operatively arranged to be non-rotatably connected to freewheel assembly 120 when displaced in first circumferential direction CD1 but rotatably connected to freewheel assembly 120 when displaced in second circumferential direction CD2.

As previously described, freewheel assembly 20, 120 provides a connection means such that circumferential displacement of float 114, 116 results in displacement of a wheel in a single circumferential direction. In particular, freewheel assembly 20, 120 is operatively arranged to displace line 160 in a single circumferential direction. Specifically, as arm 134 is displaced in circumferential direction CD1, for example if float 114 is forced upward in direction D1 by water 2, it engages wheel 122 and wheel 122 also displaces in circumferential direction CD1. As arm 134 is displaced in circumferential direction CD2, for example if water 2 subsides and gravity forces float 114 in direction D2, it disengages wheel 122 and wheel 122 is not displaced in circumferential direction CD2. As arm 138 is displaced in circumferential direction CD2, for example if float 116 is forced upward in direction D1 by water 2, it disengages wheel 126 and wheel 126 is not displaced in circumferential direction CD2. As arm 138 is displaced in circumferential direction CD1, for example if water 2 subsides and gravity forces float 116 in direction D2, it engages wheel 126 and wheel 126 also displaces in circumferential direction CD1.

As a result of the engagement of line 160 with wheels 122, 126, and 130, as wheel 122 and/or wheel 126 are displaced in circumferential direction CD1, wheel 130 is also displaced in circumferential direction CD1. Thus, floats 114 and 116 act in conjunction to displace wheel 130 in circumferential direction CD1 but not circumferential direction CD2. It should be appreciated that freewheel assembly 120 may continue to displace in circumferential direction CD1 even when arms 134 and 138 are not engaged therewith, which is an attribute of a freewheel connection. To aid in this continuous circumferential displacement, wave energy conversion assembly 110 may further comprise a flywheel non-rotatably connected to wheel 122, wheel 126, and/or wheel 130. The flywheel may continue to circumferentially displace the input shaft of generator 180 even when floats 114 and 116 are not being displaced in circumferential direction CD1.

Figure 6:
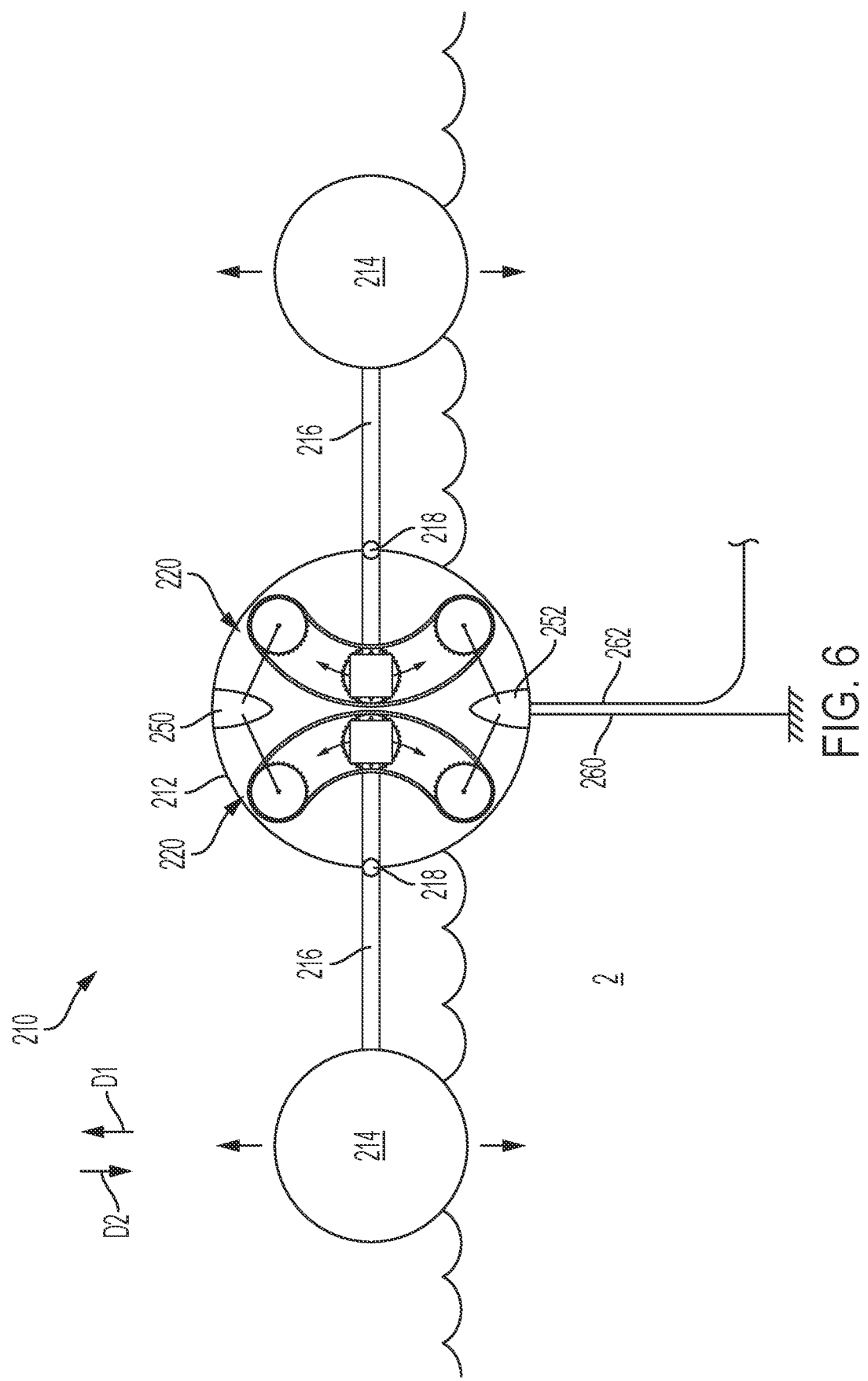
FIG. 6 is a front elevational view of a wave energy conversion assembly.

FIG. 6 is a front elevational view of wave energy conversion assembly 210. Wave energy conversion assembly 210 generally comprises one or more motion conversion assemblies, for example motion conversion assembly 220, and at least one float, for example float 214. Motion conversion assembly 220 is operatively arranged to displace one or more shafts in a single circumferential direction, so as to generate electricity. For example, motion conversion assembly 220 may circumferentially displace one or more shafts or gears to deliver rotational motion to generator 250, 252 such that generator 250, 252 produces electricity. In an exemplary embodiment, at least one of motion conversion assembly 220, generator 250, and generator 252 are arranged in housing 212. In an exemplary embodiment, motion conversion assembly 220, generator 250, and generator 252 are completely enclosed in housing 212. In an exemplary embodiment, housing 212 is buoyant and floats on or in water 2. In such embodiments, wave energy conversion assembly 210 can be placed in water 2 in an off-shore configuration. In an exemplary embodiment, housing 212 may be tethered, for example to an ocean floor, via tether 260. In an exemplary embodiment, electricity produced by generator 250 and/or generator 252 is transmitted to a remote location via conductor or power line 262.

Float 214 is a buoyant structure that is connected to motion conversion assembly 220. In an exemplary embodiment, float 214 is connected to motion conversion assembly 220 via arm or shaft 216. In an exemplary embodiment, float 214 is pivotably connected to arm 216. Float 214 is operatively arranged to displace generally in direction D1 and direction D2, due to movement of water 2. As float 214 displaces, arm 216 displaces and pivots about pivot or fulcrum 218. In an exemplary embodiment, fulcrum 218 is arranged on or in housing 212. Thus, a first portion of arm 216 is arranged outside of housing 212 and is connected to float 214, and a second portion of arm 216 is arranged inside housing 212 and is connected to motion conversion assembly 220, specifically reciprocating element 240 as will be described in greater detail below.

The buoyancy of housing 212 and float 214 provides relative movement between components that activates motion conversion assembly 220. For example, float 214 is capable of relative movement with respect to housing 212 due to movement of water 2. Likewise, housing 212 is capable of relative movement with respect to float 214 due to movement of water 2.

Figure 7:
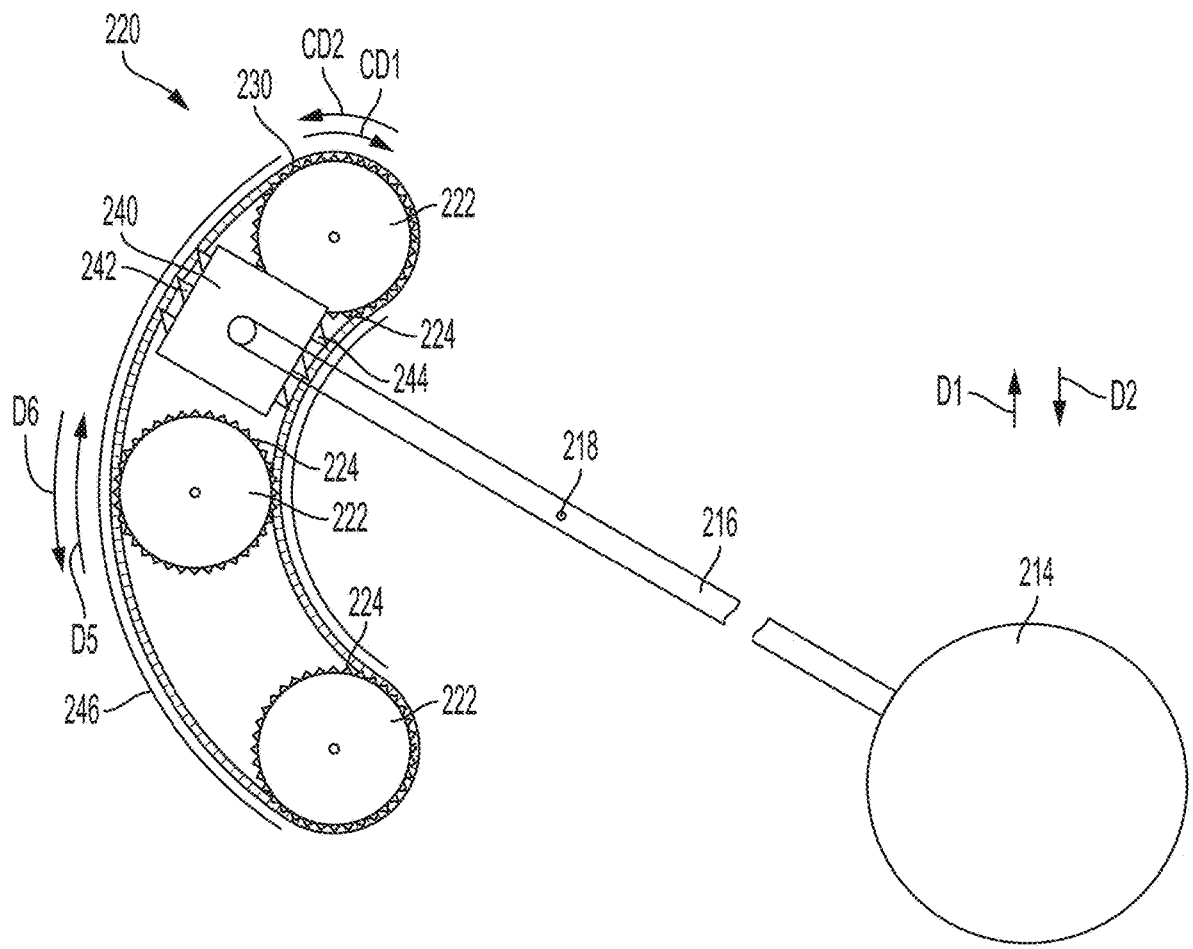
FIG. 7 is a front elevational view of the motion conversion assembly shown in FIG. 6.

FIG. 7 is a front elevational view of motion conversion assembly 220. Motion conversion assembly 220 is operatively arranged to displace one or more shafts in a single circumferential direction, for example, circumferential direction CD1. Motion conversion assembly 220 generally comprises reciprocating element 240, chain or belt or line 230, and at least one sprocket or gear or wheel 222. In an exemplary embodiment, motion conversion assembly 220 comprises three wheels 222 as best shown in FIG. 7. Float 214 is connected to reciprocating element 240 and is arranged to engage water 2 such that, as water 2 displaces, float 240 displaces generally in direction D1 and direction D2. Displacement of water 2 may occur via waves or tide. Reciprocating element 240 is connected to float 214 via shaft 216. In an exemplary embodiment, shaft 216 is pivotably connected to float 214. In an exemplary embodiment, shaft 216 is pivotably connected to reciprocating element 240. Shaft 216 is engaged with fulcrum 218, as previously described. Fulcrum 218 is operatively arranged to limit stress on reciprocating element 240 and/or multiply the displacement of float 214 for a larger reciprocating element 240 stroke.

Reciprocating element 240 is operatively arranged to be displaced generally in direction D5 and direction D6 (via float 214) and displace wheels 222 in circumferential direction CD1. Reciprocating element 240 comprises one or more pawls 242 and one or more pawls 244. Pawls 242 and 244 are arranged to engage line 230. Specifically, pawl 242 is arranged to displace chain 230 when reciprocating element 240 is displaced in direction D5, but not displace chain 230 when reciprocating element 240 is displaced in direction D6. Pawl 244 is arranged to displace chain 230 when reciprocating element 240 is displaced in direction D6, but not displace chain 230 when reciprocating element 240 is displaced in direction D5. The arrangement of pawls 242 and 244 provide for constant displacement of chain 230, and thus wheels 222, in a single direction regardless of the displacement direction of reciprocating element 240. In an exemplary embodiment, chain 230 is a polymer chain. In an exemplary embodiment, element 230 is a notched belt, wherein pawls 242 and 244 engage notches in notched belt 230 as described above.

In an exemplary embodiment, motion conversion assembly 220 further comprises curvilinear guide 246. Guide 246 is operatively arranged to hold line 230 in a generally curvilinear geometry, as shown. As such, guide 246 and line 230 exhibit a curvilinear path having a radius that is the same as the radius of travel of reciprocating element 240. The normal path of the distal end of arm 216 follows an arc upon displacement about fulcrum 218, and thus line 230 is shaped to exact the displacement arc of the distal end of arm 216 via guide 246. Moreover, the arrangement of arm 216 about fulcrum 218 increases the magnitude and speed of reciprocating element 240. In an exemplary embodiment, the fulcrum 218 is arranged about arm 216 such that the speed and magnitude of reciprocating element 240 produces an angular velocity on generator 250, 252 in the range of 1,500-1,900 rpm.

Wheel 222 comprises teeth 224 engaged with line 230. In an exemplary embodiment, and as shown, motion conversion assembly 220 comprises at least two wheels 222 which stretch out and maintain tension within line 230 (i.e., one at a first end and another at a second end). In an exemplary embodiment, motion conversion assembly 220 may have one or more intermediary wheels 222 operatively arranged to produce the curvilinear shape of line 230. In such embodiments, namely, the use of multiple wheels 222 arranged in a curvilinear path, guide 246 may not be necessary; although it should be appreciated that in an exemplary embodiment multiple wheels 222 and guide 246 may be used to provide the best curvilinear shape of line 230. In an exemplary embodiment, alternative to one of the end wheels 222, motion conversion assembly 220 may comprise a curvilinear surface to maintain tension within line 230.

At least one of wheels 222 is non-rotatably connected to generator 250, 252. In some embodiments, the first end wheel 222 is non-rotatably connected to a shaft to input mechanical work into generator 250, and the second end wheel 222 is non-rotatably connected to a shaft to input mechanical work into generator 252 (as shown in FIG. 6). Generator 250, 252 is a rotary electrical generator. Wheels 222 are is operatively arranged to deliver rotational motion to generator 250, 252 such that generator 250, 252 produces electricity.

In an exemplary embodiment, motion conversion assembly 220 may further comprise a flywheel non-rotatably connected to at least one of wheels 220. The flywheel(s) serves to smooth out the pulses of energy provided by reciprocating element 240, and store energy for when reciprocating element 240 is no longer supplying energy (i.e., is stationary). For example, when wheels 222 stop moving, the energy stored in the flywheel will continue to rotate a shaft and/or gear to generator 250, 252 due to the energy stored in the flywheel, thereby continuing to produce electricity via generator 250, 252. To further facilitate such continued rotation of a input shaft to generator 250, 252, such input shaft may be connected to wheel 222 via a freewheel connection. By freewheel connection, it is meant that as wheel 222 displaces in a first circumferential direction, the input shaft displaces in the first circumferential, but when wheel 222 stops moving, the input shaft may continue to displace in the first circumferential direction.

Figure 8:
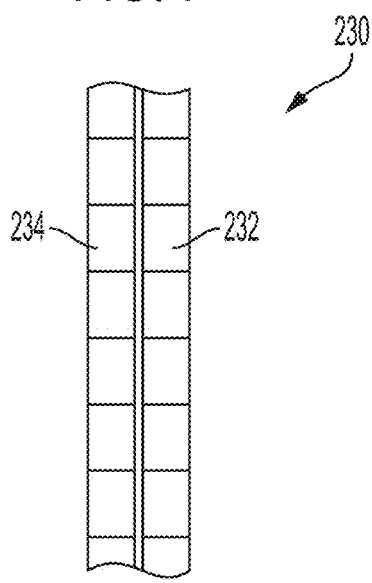
FIG. 8 is a partial side elevational view of an embodiment of the chain shown in FIG. 6.

FIG. 8 is a partial side elevational view of an embodiment of chain 230. As shown, chain 230 comprises first side 232 and second side 234. First side 232 comprises a plurality of chain links, grooves, or notches and second side 234, which is fixedly secured to first side 232, comprises a plurality of chain links, grooves, or notches. In an exemplary embodiment, reciprocating element 240, specifically pawls 242 and 244, is engaged with one of first side 232 and second side 234, and wheels 222, specifically teeth 224, are engaged with the other of first side 232 and second side 234. In such embodiment, reciprocating element 240 is capable of exhibiting larger/longer strokes as it is not inhibited by the wheels 222 (i.e., reciprocating element 240 will not contact wheels 222). Additionally, the life of line 230 can be extended because pawls 242 and 244 and wheels 222 no longer engage the same part of line 230 (e.g., the same chain links).

Figure 9:
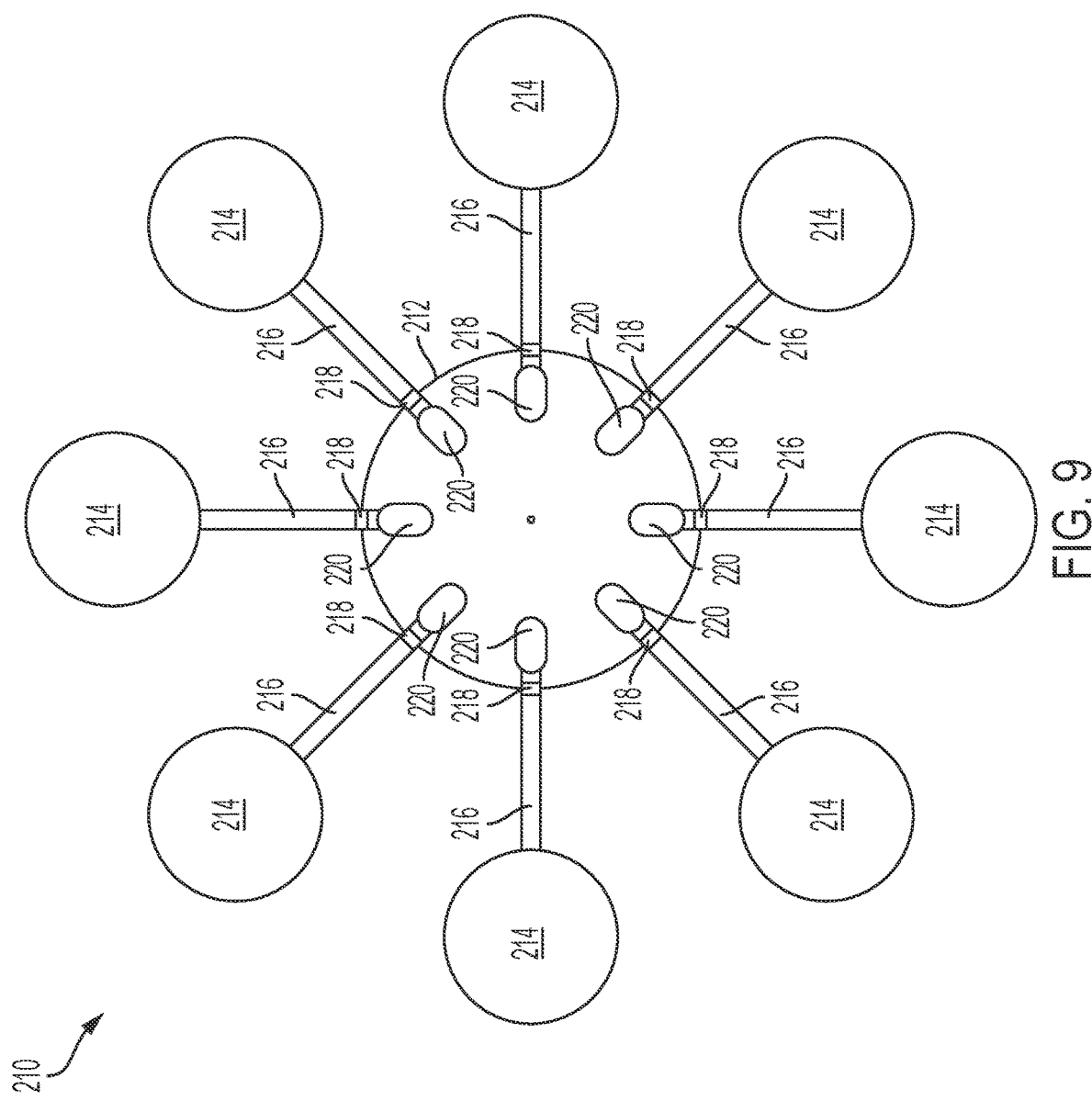
FIG. 9 is a top plan view of an embodiment of the wave energy conversion assembly shown in FIG. 6.

FIG. 9 is a top plan view of an embodiment of wave energy conversion assembly 210. It should be appreciated that wave energy conversion assembly 210 may comprise any number of motion conversion assemblies 220 and respective floats 214 and arms 216 suitable for converting wave energy to electricity. For example, in FIG. 9, wave energy conversion assembly 210 is shown comprising eight motion conversion assemblies 220, each connected to a respective float 214 via a respective arm 216. In FIG. 6, wave energy conversion assembly 210 is shown comprising two motion conversion assemblies 220, each connected to a respective float 214 via a respective arm 216.

Figure 10:
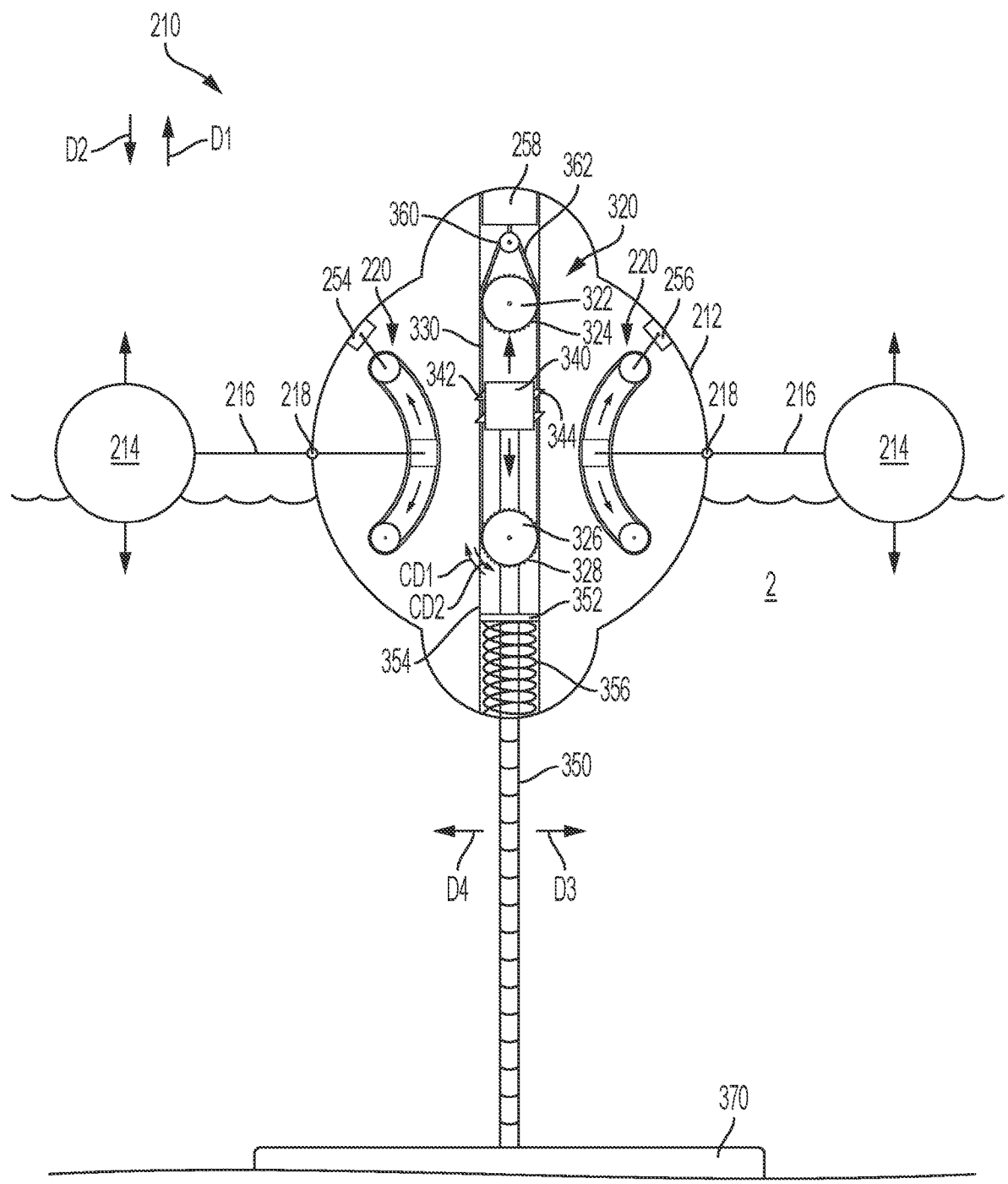
FIG. 10 is a front elevational view of a wave energy conversion assembly.

FIG. 10 is a front elevational view of wave energy conversion assembly 210 including additional motion conversion assembly 320. Motion conversion assembly 320 comprises sprocket or gear or wheel 322, sprocket or wheel or gear 326, chain or belt or line 330, reciprocating element 340, and shaft or cable rod 350. Motion conversion assembly 320 is operatively arranged to displace a shaft and or gear in a single circumferential direction, for example, circumferential direction CD1, to deliver mechanical energy to a generator to produce electrical energy. Motion conversion assembly 320 is arranged at least partially in housing 212. Housing 212 is buoyant and arranged to float on or in water 2. As water 2 displaces, housing 212 displaces generally in direction D1 and direction D2. Shaft 350 extends out of housing 212 and is fixed at a distal end, for example, to an ocean floor via anchor 370. In an exemplary embodiment, shaft 350 is pivotably connected to anchor 370. In an exemplary embodiment, shaft 350 is elastically deformable (i.e., a flexible shaft).

Reciprocating element 340 is operatively arranged to be displaced generally in direction D1 and direction D2 with respect to line 330, due to the displacement of housing 212 in direction D1 and direction D2, and displace wheel 322 and wheel 326 in circumferential direction CD2. Specifically, as housing 212 displaces in directions D1 and D2 due to the motion of water 2, reciprocating element 340 generally remains elevationally in place, whereas wheels 322 and 326 displace in directions D1 and D2 with respect to reciprocating element 340. Reciprocating element 340 comprises one or more pawls 342 and one or more pawls 344. Pawls 342 and 344 are arranged to engage the chain links, notches, or grooves of line 330. Specifically, pawl 342 is arranged to displace line 330 when housing 212 and wheels 322 and 326 are displaced in direction D1, but not displace line 330 when housing 212 and wheels 322 and 326 are displaced in direction D2. Pawl 344 is arranged to displace line 330 when housing 212 and wheels 322 and 326 are displaced in direction D2, but not displace line 330 when housing 212 and wheels 322 and 326 are displaced in direction D1. The arrangement of pawls 342 and 344 provide for constant displacement of line 330 and thus wheel 322, 326, in a single direction regardless of the displacement direction of housing and wheels 322 and 326. In an exemplary embodiment, line 330 is a polymer chain. In an exemplary embodiment, element 330 is a notched belt, wherein pawls 342 and 344 engage notches in notched belt 330 as described above.

Wheel 322 comprises teeth 324 engaged with line 330. Wheel 326 comprises teeth 328 engaged with line 330. Wheels 322 and 326 are operatively arranged to maintain tension within line 330. In an exemplary embodiment, alternative to wheel 326, motion conversion assembly 320 comprises a curvilinear surface or plane slidably engaged with 330 to maintain tension within line 330. Wheel 322 is non-rotatably connected to a generator, for example generator 250, via a shaft and/or gear. In an exemplary embodiment, wave energy conversion assembly 210 further comprises one or more smaller diameter sprockets or gears 360 non-rotatably connecting wheel 322 with generator 258, to increase angular velocity of the generator input shaft or gear. Wheel 322 comprises a first diameter and wheel 360 comprises a second diameter, less than the first diameter. Wheel 322 is non-rotatably connected to wheel 360 via chain or belt or line 362. Such arrangement results in wheel 360 exhibiting a greater angular velocity than wheel 322.

In an exemplary embodiment, motion conversion assembly 320 further comprises plate 352 and tensioning member or spring 356. Plate 352 is connected to shaft 350 creating a flange thereon. In an exemplary embodiment, plate 352 is fixedly secured to shaft 350. Spring 356 is arranged between plate 352 and housing 212 to bias housing 212 to a starting elevational position. For example, when water 2 rises and housing 212 displaces in direction D1, spring 356 will bias housing 212 back down to the starting elevational position, namely, in direction D2. When water 2 subsides and housing 212 displaces in direction D2, spring 356 will bias housing 212 back up to the starting elevational position, namely, in direction D1. This bias helps maintain housing 212 in a centered position (i.e., the starting elevational position) with respect to reciprocating element 340. This bias also helps create more continuous movement of housing 212 and wheels 322 and 326 with respect to reciprocating element 340. In an exemplary embodiment, motion conversion assembly 320 may further comprise tube 354 circumferentially arranged around spring 356 to provide added structure and support thereto (e.g., to maintain alignment of spring 356).

As shown in FIG. 10, motion conversion assembly 340 is connected to and drives generator 258, a first motion conversion assembly 220 is connected to and drives generator 254, and a second motion conversion assembly 220 is connected to and drives generator 256. However, in some embodiments, motion conversion assembly 340 and motion conversion assemblies 220 may be connected to the same generator. Moreover, the flexibility of shaft 350 allows wheel 322 to be driven even when housing 212 is displaced in direction D3 and direction D4. For example, as housing 212 is displaced in directions D3 or D4, shaft 350 will bend and housing 212 and wheels 322 and 326 will displace longitudinally with respect to reciprocating element 340 and shaft 350. Spring 356 will bias housing 212 back to its starting elevational position. It should be appreciated that while reciprocating element 340 does not actually reciprocate with respect to wheels 322 and 326, since wheels 322 and 326 reciprocate with respect to reciprocating element 340, there is still reciprocating movement between reciprocating element 340 and wheels 322 and 326, and thus element 340 can still be considered a reciprocating element since it moves backward and forward with respect to wheels 322 and 326.

It should be appreciated that the various motion conversion assemblies and freewheel assemblies disclosed herein could provide mechanical input to generators, which in turn feed ultracapacitors that coordinate electric discharge to a single land line or conductor, or individually feed electricity through smaller cables (e.g., that leave at a bottom of the housing along with the tether line and then along a cable to shore).

It should be appreciated that various materials may be used for elements of the assemblies disclosed here, for example, polymers, synthetic fibers, duplex steel, etc. Such materials are resistant to corrosion from water and salt water. Certain materials are also lighter and less prone to rust.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Water or fluid
10 Wave energy conversion assembly
12 Housing
14 Float
16 Float
20 Freewheel assembly
22 Sprocket or gear or wheel
24 Surface
26 Surface
28 Teeth
30 Teeth
32 Teeth
34 Arm or shaft
36 Teeth
38 Arm or shaft
40 Teeth
42 Pawl
50 Connector
52 Connector
60 Chain or belt or line
70 Sprocket or gear or wheel
72 Teeth
74 Sprocket or gear or wheel
76 Teeth
80 Generator
82 Generator
110 Wave energy conversion assembly
114 Float
116 Float
120 Freewheel assembly
122 Sprocket or gear or wheel
124 Teeth
126 Sprocket or gear or wheel
128 Teeth
130 Sprocket or gear or wheel
132 Teeth
134 Arm or shaft
138 Arm or shaft
160 Chain or belt or line
180 Generator
210 Wave energy conversion assembly
212 Housing
214 Float
216 Arm or shaft
218 Pivot point or fulcrum
220 Motion conversion assembly
222 Sprocket or gear or wheel
224 Teeth
230 Chain
232 Side
234 Side
240 Reciprocating element
242 Pawls
244 Pawls
246 Guide
250 Generator
252 Generator
254 Generator
256 Generator
258 Generator
260 Tether
262 Conductor or power line
320 Motion conversion assembly
322 Sprocket or gear or wheel
324 Teeth
326 Sprocket or gear or wheel
328 Teeth
330 Chain or belt or line
340 Reciprocating element
342 Pawls
344 Pawls
350 Shaft or cable rod
352 Plate
354 Tube
356 Tensioning member or spring
360 Sprocket or gear or wheel
362 Chain or belt or line
370 Anchor
CD1 Circumferential direction
CD2 Circumferential direction
D1 Direction
D2 Direction
D3 Direction
D4 Direction
D5 Direction
D6 Direction

What is claimed is:
1. A wave energy conversion assembly, comprising:
a first motion conversion assembly, including:
  a first wheel;
  a first reciprocating element including a first pawl; and
  a first line connected to the first reciprocating element and the first wheel;
an arm connected to the first motion conversion assembly; and
a float connected to the arm;
wherein:
  the float is operatively arranged to engage fluid to displace the first wheel in a first circumferential direction;
  when the first reciprocating element is displaced in a first direction, the first pawl engages the line; and when the reciprocating element is displaced in a second direction, opposite the first direction, the first pawl disengages the line.

2. The wave energy conversion assembly as recited in claim 1, wherein:
the first line comprises a first side and a second side;
the first wheel is engaged with the first side; and
the first pawl is engaged with the second side.

3. The wave energy conversion assembly as recited in claim 1, wherein the first motion conversion assembly further comprises a second wheel spaced apart from the first wheel to create tension in the first line.

4. The wave energy conversion assembly as recited in claim 1, further comprising a housing, wherein the first motion conversion assembly is arranged in the housing.

5. The wave energy conversion assembly as recited in claim 4, wherein the housing forms a fulcrum engaged with the arm.

6. The wave energy conversion assembly as recited in claim 4, wherein the housing is buoyant.

7. The wave energy conversion assembly as recited in claim 4, further comprising a second motion conversion assembly including a second wheel.

8. The wave energy conversion assembly as recited in claim 7, wherein the second motion conversion assembly comprises:
a second reciprocating element including a second pawl;
a shaft connected to the second reciprocating element; and
a second line connected to the second reciprocating element and the second wheel;
wherein the housing and second wheel are operatively arranged to displace with respect to the second reciprocating element.

9. The wave energy conversion assembly as recited in claim 8, wherein:
when the housing and second wheel are displaced in a first direction, the second pawl engages the second line; and
when the housing and second wheel are displaced in a second direction, the second pawl disengages the second line.

10. The wave energy conversion assembly as recited in claim 8, wherein the second motion conversion assembly further comprises a tensioning member operatively arranged to bias the housing to a starting elevational position.

11. The wave energy conversion assembly as recited in claim 8, wherein the shaft is flexible.

12. The wave energy conversion assembly as recited in claim 1, wherein the first wheel is connected to a generator.

13. The wave energy conversion assembly as recited in claim 1, wherein the arm is connected to the first wheel via a freewheel connection.

14. The wave energy conversion assembly as recited in claim 13, wherein the freewheel connection comprises:
a plurality of teeth arranged on one of the arm and the first wheel; and
one or more pawls arranged on the other of the arm and the first wheel.

15. The wave energy conversion assembly as recited in claim 14, wherein the one or more pawls are operatively arranged to:
engage the plurality of teeth when the arm is displaced in the first circumferential direction; and
disengage the plurality of teeth when the arm is displaced in a second circumferential direction, opposite the first circumferential direction.

16. The wave energy conversion assembly as recited in claim 13, further comprising:
a second arm connected to the first wheel; and
a second float connected to the second arm.

17. The wave energy conversion assembly as recited in claim 1, wherein the first reciprocating element translatable displaces along a path toward and away from the first wheel.

18. The wave energy conversion assembly as recited in claim 1, wherein the first reciprocating element is translatably displaceable along a linear or curvilinear path.

19. A wave energy conversion assembly, comprising:
a housing;
a motion conversion assembly arranged in the housing and including:
a line;
a reciprocating element comprising at least one pawl arranged to removably engage the line; and
at least one wheel engaged with the line;
an arm including a first portion arranged in the housing and connected to the reciprocating element and a second portion arranged outside the housing; and
a float connected to the second portion;
wherein relative movement between the float and the housing causes the reciprocating element to displace the line and the at least one wheel in a single circumferential direction.

20. A wave energy conversion assembly, comprising:
a housing;
a wheel arranged in the housing; and
one or more arms connected to the wheel via a freewheel connection, wherein each arm of the one or more arms includes:
a first portion arranged in the housing and connected to the wheel;
a second portion arranged outside the housing; and
a float connected to the second portion;
wherein relative movement between the float and the housing causes the wheel to displace in a single circumferential direction.

* * * * *